United States Patent [19]

Shimizu et al.

[11] 3,739,185

[45] June 12, 1973

[54] CIRCUIT SYSTEM FOR SWITCHES OF AN AUTOMOBILE

[75] Inventors: Tetsuji Shimizu, Showa-ku, Nagoya; Yoichi Hotta, Kita-ku, Nagoya; Takaomi Yoshida, Nishi-ku, Nagoya, all of Japan

[73] Assignee: Kabushiki Kaisha Tokai Rika Denki Seisakusha, Nishikasugai-gun, Aichi Prefecture, Japan

[22] Filed: June 30, 1971

[21] Appl. No.: 158,371

[30] Foreign Application Priority Data

July 2, 1970 Japan.............................. 45/57246
July 3, 1970 Japan.............................. 45/57737
July 4, 1970 Japan.............................. 45/58147
Aug. 31, 1970 Japan.............................. 45/75738

[52] U.S. Cl............ 307/10 R, 307/115, 340/147 R
[51] Int. Cl............................................... H02g 3/00
[58] Field of Search................ 307/10 R, 140, 113, 307/115, 10 LS, 9; 340/147 R, 147 B

[56] References Cited
UNITED STATES PATENTS 3,651,454 3/1972 Venema et al.................... 307/10 R
3,652,865 3/1972 Holt................................. 307/10 R
3,683,197 8/1972 Ives................................. 307/10 R
3,392,626 7/1968 Miller et al..................... 315/194 X

OTHER PUBLICATIONS

GE Electronics Components Hobby Manual 2d edition 1965 p. 92
Popular Electronics, Nov. 1969, p. 66

Primary Examiner—Robert K. Schaefer
Assistant Examiner—William J. Smith
Attorney—Woodhams, Blanchard & Flynn

[57] ABSTRACT

A circuit system for switches of an automobile in which passive elements are respectively connected between contacts of the switches and a grounding, each of the switches or each group of the switches is connected to a signal detecting circuit through one signal line and said signal line is grounded through a contact corresponding to an operative position of the switch or the group of switches and the passive element, thereby to transmit a signal corresponding to said operative position of the switch or the group of switches for energizing a load corresponding to said signal. With such a circuit system, the switches can be made much small-sized and the signal line is prevented from being bulky. A possible trouble in a conventional switch system, such as a melting of a contact or a burning of a signal line can be well prevented.

12 Claims, 9 Drawing Figures

Patented June 12, 1973  3,739,185

INVENTORS
TETSUJI SHIMIZU
YOICHI HOTTA
TAKAOMI YOSHIDA
BY Woodhams, Blanchard & Flynn
ATTORNEYS

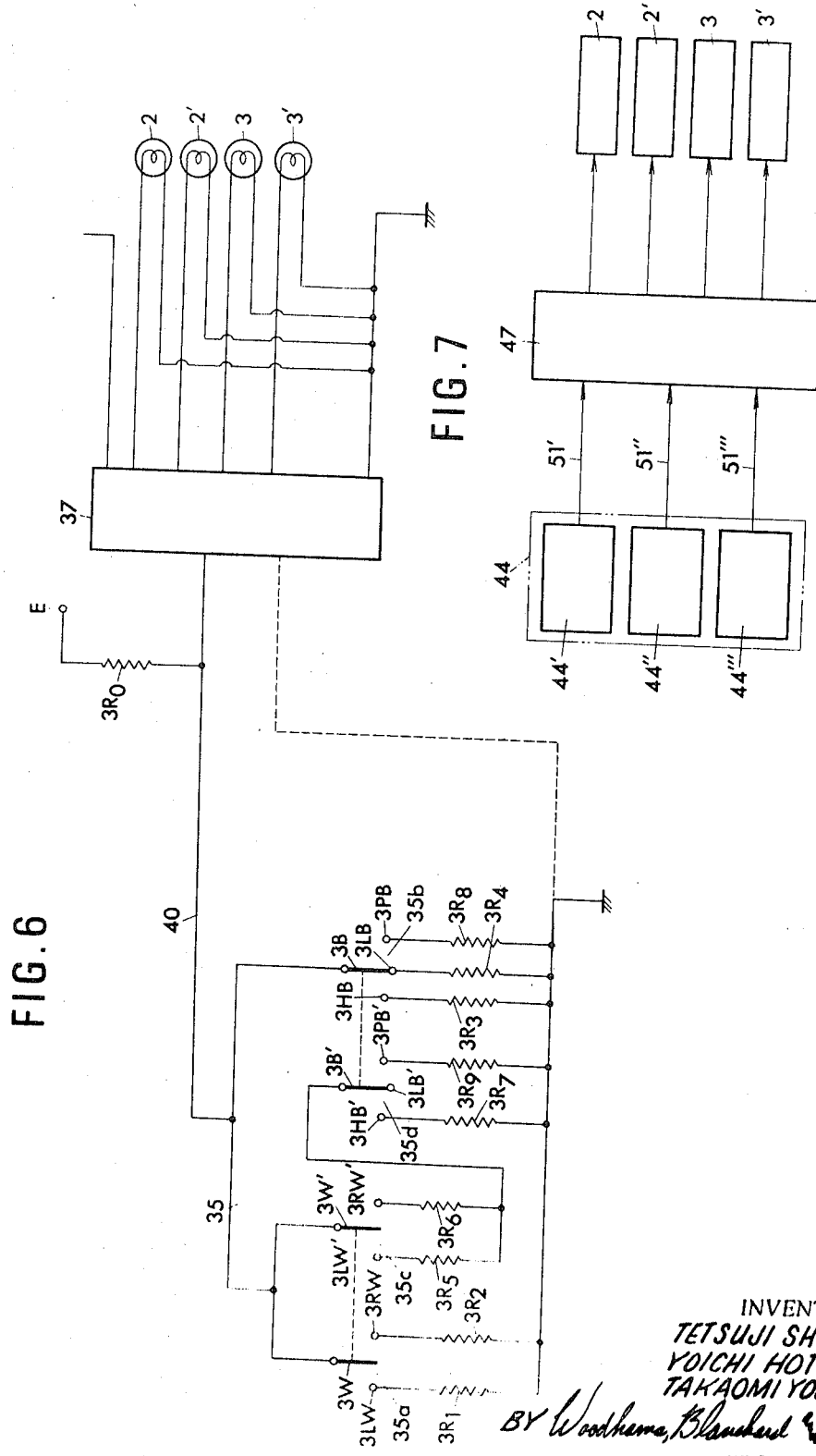

CIRCUIT SYSTEM FOR SWITCHES OF AN AUTOMOBILE

This invention relates to a circuit system for switching a plurality of switches provided in an automobile, normally adjacent the vehicle operator's position for actuation by the operator, such as a lever switch mounted at the base portion of a steering wheel including a turn signal switch, a dimmer switch, a passing signal switch, etc. or a group of switches mounted on a dashboard including a hazard warning signal switch, a windshield wiper switch, a lighting switch, etc., by connecting one signal line per switch or group of switches, not per contact of a switch, to control a plurality of loads.

In a conventional switching system as shown for illustration in FIG. 1, for a group of switches of an automobile, elements such as a lever switch 1, a left and a right turn signal lamp 2, 2' are connected to respective contacts of a turn signal switch, and a high-beam and a low-beam head lamp 3, 3' to respective contacts of a dimmer and passing signal switch so that a large current is applied to the lamps 2, 2', 3 and 3' through their respective contacts. A large current also flows through said lever switch 1 so that it is required to make a lever switch to be bulky. As a result, there is some difficulty in mounting the lever switch on a steering wheel and possible troubles with the switch due to a melting of contacts. A conventional lever switch has a further disadvantage such that a whole switch is to be replaced even in a case only a contact is damaged. As a large current flows through a connecting code, it is required to employ a wire of large capacity which is bulky and troublesome to deal with and there is caused a trouble in wiring of the codes or a possible burning out trouble of the codes.

The present invention is made to overcome such disadvantages of the conventional switching system as mentioned above and therefore it is an object of the present invention to provide a circuit system for switches of an automobile having only one signal line of a connecting code per switch or group of switches, thereby to facilitate wiring and dealing with the connecting code.

It is another object of the present invention to provide a circuit system for switches of an automobile in which there may be mounted in the respective switches only contacts thereof and passive elements such as resistors and only a small current is required to turn loads so that a switch body can be small-sized and a possible trouble such as melting of the contacts or burning out of a connecting code can be well prevented.

It is a further object of the present invention to provide a circuit system for switches of an automobile in which a circuit system or a wiring is simplified, thereby to mass-produce a device of the circuit system at a reasonable price.

It is a still further object of the present invention to provide a circuit system for switches of an automobile in which a signal is sent through a signal line in the form of voltage, thereby to enable a signal transmitting circuit to be simplified.

It is a still further object of the present invention to provide a circuit system for switches of an automobile which is capable of setting a signal voltage at a desired resistance value to control different kinds of loads and eliminate a possible misoperation of switching.

It is a still further object of the present invention to provide a circuit system for switches of an automobile which is capable of switching loads such as head lamps which require a large current, at a portion near said loads, thereby to rationalize a wiring and reduce a voltage drop on the way to loads.

According to the present invention, there is provided a circuit system for switches of an automobile in which passive elements are respectively connected between contacts of the switches and a grounding, each of the switches or each group of the switches is connected to a signal detecting circuit through one signal line and said signal line is grounded through a contact corresponding to an operative position of the switch or the groups of switches and the passive element, thereby to transmit a signal corresponding to said operative position of the switch or the group of switches for energizing a load corresponding to said signal.

The invention will be better understood from the following description taken in connection with the accompanying drawings in which.

Figure 4:
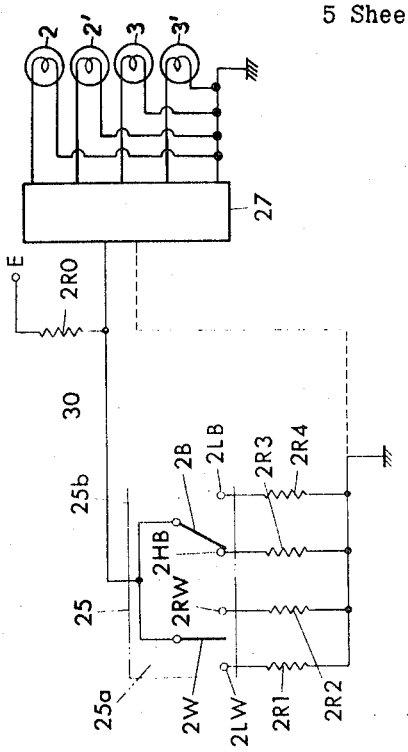
Figure 5:
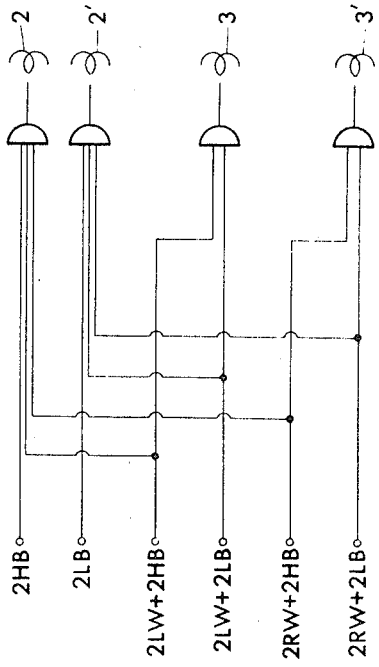
Figure 1:
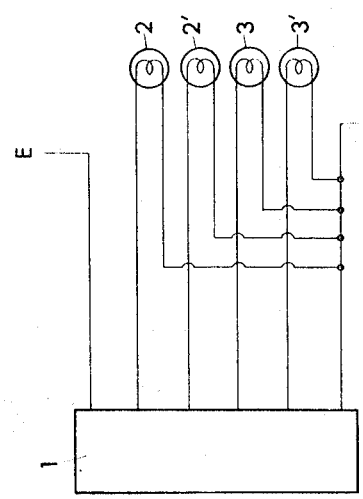
FIG. 1 is a diagram of a conventional system for switching a plurality of switches of an automobile.
Figure 2:
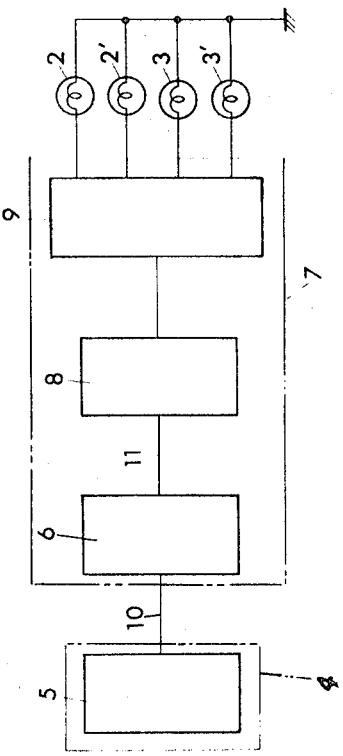
FIG. 2 is a diagram of a system according to the present invention for switching a plurality of switches of an automobile.
Figure 3A:
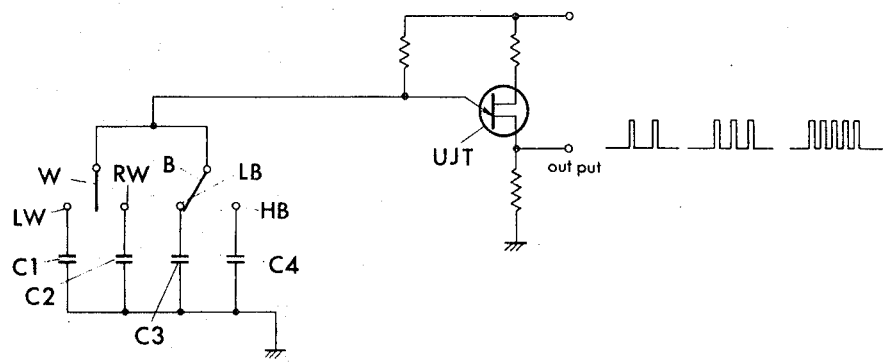
Figure 3B:
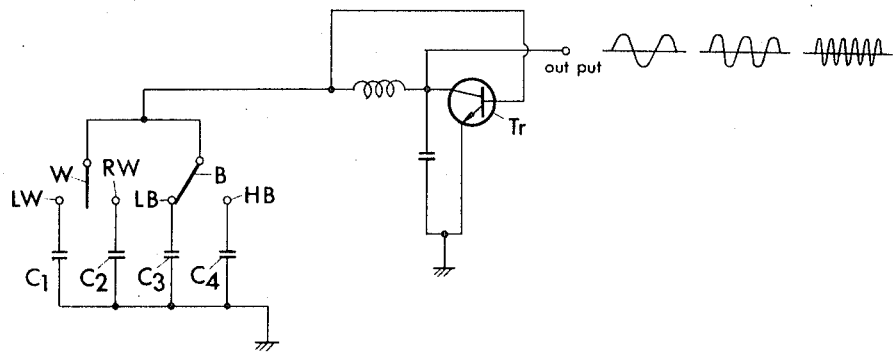
Figure 3C:
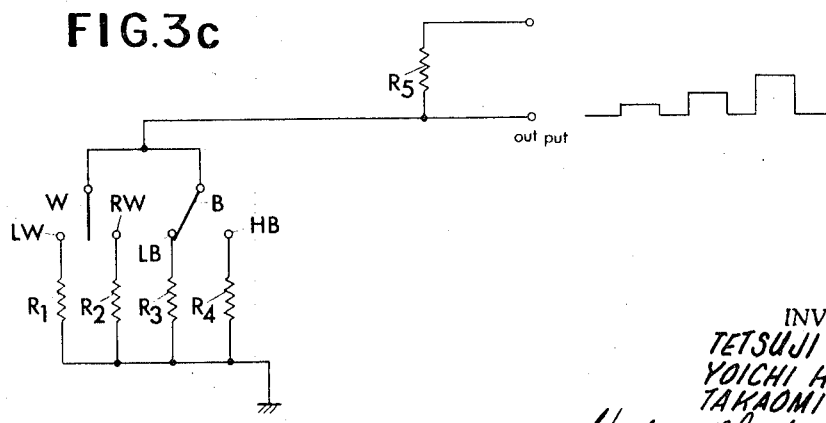
Figure 8:
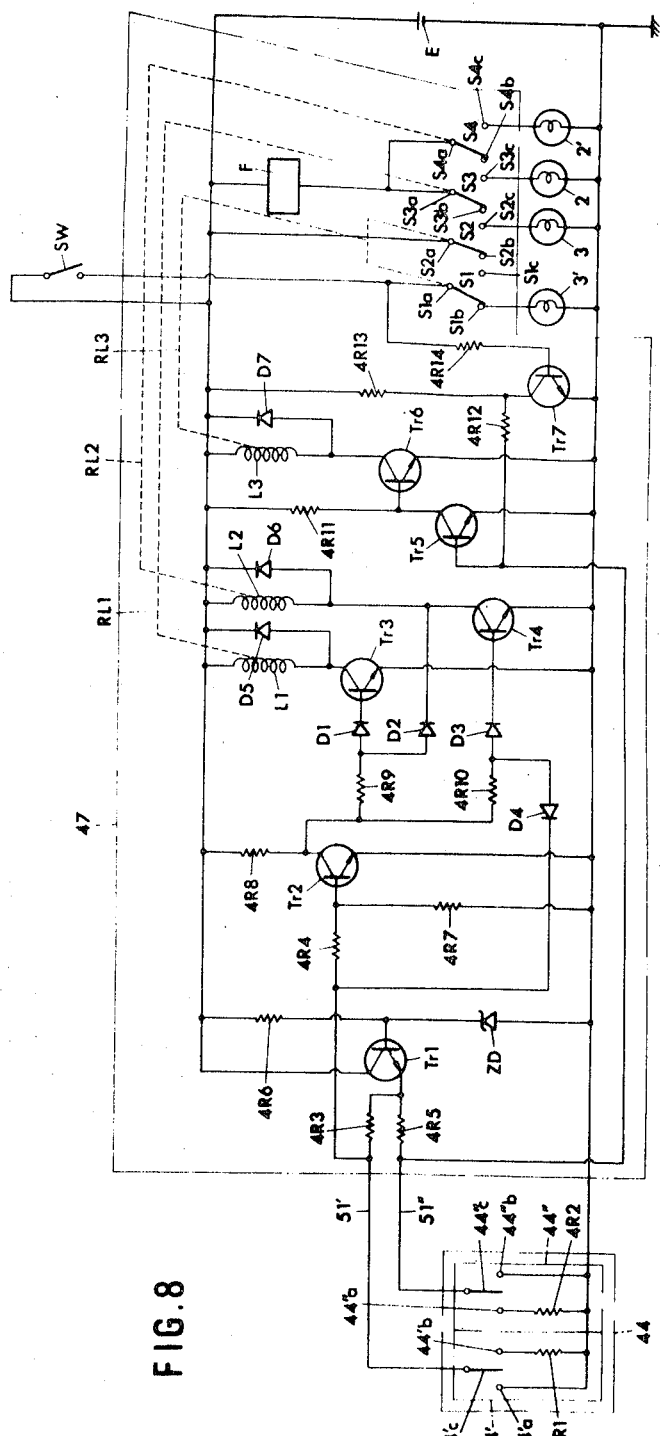

FIG. 3, (a), (b) and (c) illustrate three ways of the system shown in FIG. 2 in the form of circuit diagrams;

FIG. 4 is a circuit according to the system of the present invention;

FIG. 5 is a diagram of a logical circuit of a detecting section employed in the present invention;

FIG. 6 is another circuit according to the system of the present invention;

FIG. 7 is a diagram of another system according to the present invention;

FIG. 8 is a circuit based on the method shown in FIG. 7; and

Figure 9:
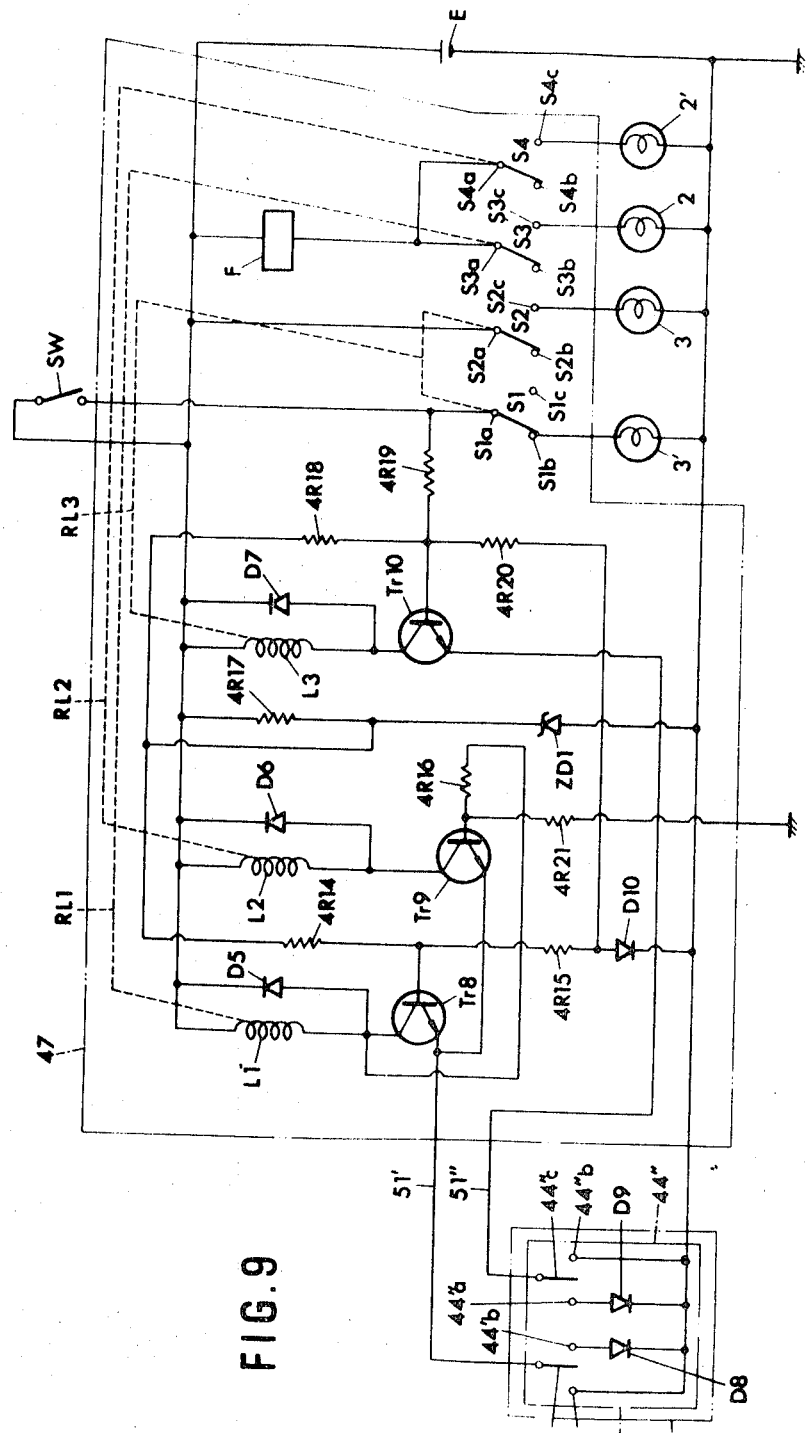

FIG. 9 is another circuit based on the method shown in FIG. 7.

In the drawings and the description, like portions or parts are denoted by like numerals or characters.

Referring now to FIGS. 2 through 3, there is illustrated a system of the present invention for switching a plurality of switches of an automobile. A switching section 5 is, alike conventional switches of the kind, provided in a lever-switch body with contacts LW and RW for turn signal lamps, contacts HB and LB for a high-beam and a low-beam lamp and contacts for passing indication (not shown in FIG. 3, (a) to (c)). Between the contacts LW, RW, HB and LB and a grounding line or, a casing of the lever-switch body in case said casing is used for grounding, are respectively connected condensers $C_1$ to $C_4$ of different capacities or resistors $R_1$ to $R_4$ of different values. An output terminal of said switching section 5 is connected to a signal line 10 which is connected to movable contacts W and B. Said movable contacts W and B are adapted to be switched by operating a lever of the lever-switch to apply an input to a circuit 6 for generating a load-controlling signal. A signal transmitting circuit 4 comprises said switching section 5. Depending upon the operative position of the lever, different signals are transmitted through line 10 to the control signal generating circuit 6''. A discriminating circuit 8 receives a signal from said control signal generating circuit 6 to determine a load corresponding to said operative position of the lever. A drive circuit 9 receives a signal from said discriminating circuit 8 to drive a load corresponding to said signal. Said drive circuit 9 includes a relay or a semiconductor switching element. A detecting circuit 7 is composed of control signal generating circuit 6, said logical circuit 8 and said drive circuit 9. Thus, according to the present invention, only the switching section 5 is required to be provided in the lever-switch body and only the signal line 10 is to be drawn out therefrom.

Three ways for transmitting a signal by such a signal transmitting circuit 4 will be explained referring to FIG. 3, (a) through (c). FIG. 3, (a) shows a way for producing a signal by varying a capacity of a condenser. By switching the movable contact W or B, a capacity is varied and a pulse interval of an output is varied by a unijunction transistor of the signal receiving circuit 6.

FIG. 3, (b) shows another way of producing a signal by varying a capacity of a condenser. Similarly to the way of FIG. 3, (a), a capacity is varied to oscillate a transistor circuit of the control signal generating circuit 6 with different frequencies.

FIG. 3, (c) shows a further way of producing a signal by varying a value of resistance. The movable contacts W and B are switched to vary a value of resistance and produce signals of different voltages by resistance division with a resistor $R_5$ of the control signal generating circuit 6.

Thus, it will be seen that when the lever of the lever switch is operated, the movable contact W or B is switched to transmit different signals through the signal line 10. These signals are detected by the discriminating circuit 8 and, then, a lamp 2, 2', 3 or 3' corresponding to said signals is connected to a power source through a relay etc. to light it. The lamp 2, 2', 3 or 3' is lit according to the connecting relation between the contact W or B and the contact LW, RW, HB or LB. In case the movable contact W is connected to either a contact LW or a contact RW and, at the same time, the movable contact B is connected to either a contact HB or LB, a corresponding lamp is energized by the discriminating circuit 8 and the dividing circuit 9.

Though in the foregoing are given only three ways of producing a signal, such a method as varying a pulse interval or frequency by connecting condensers of different capacities or varying a voltage by connecting resistors of different values, other methods for producing a signal may be employed for the present invention.

As mentioned above, according to the present invention, an output of each switch is converted into a signal and transmitted through one signal line connected per switch or group of switches so that a bulky bundle of signal lines is eliminated thereby to facilitate a setting operation of the switch. In a circuit of the present invention, only a small current flows through each contact of the switches so that possible troubles such as melting of the contact or burning out of the signal line can be well prevented and the switch employed can be small-sized. Of course, a device having a circuit according to the present invention can be made very small in size by employing an integrated circuit for a control signal generating circuit, a logical circuit or a driving circuit.

Referring to FIGS. 4 to 5, there is illustrated a circuit for controlling a winker and a dimmer according to the system of the present invention. A winker-dimmer switch 25 is, as shown in FIG. 4, composed of a three-point switch 25a for a turn signal lamp and a two-point switch 25b for a dimmer. Between fixed contacts 2LW and 2RW of the turn signal switch 25a and a grounding line and between fixed contacts 2HB and 2LB and said grounding line are connected resistors $2R_1$ to $2R_4$ of different values. Movable contacts W and B adapted to be switched upon an operation of a lever of the switch 25 are connected with each other and further connected to a detecting circuit 27 through a signal line 30 of a connecting code. Other codes drawn out from the switch are only a power supply line or a grounding line which may be omitted in case a casing of the switch 25 is used for grounding. At the side of the detecting circuit 27, between the signal line 30 and a power supply E is connected a resistor $2R_0$. The voltage applied to the signal line 30 is a divided voltage by the resistors $2R_1$ to $2R_4$ with the resistor $2R_O$. The detecting circuit 27 includes a discriminating circuit as shown by the logic circuitry, including OR gates, FIG. 5, in which output is obtained depending upon the connecting relation between the movable contacts W and B of the turn signal switch 25a and the dimmer switch 25b and the fixed contacts 2LW, 2RW, 2HB and 2LB. Stated illustratively, a high-beam lamp 2 is lit in three cases when the movable contact 2B is connected to the fixed contact 2HB and the movable contact 2W is connected to neither of the contacts 2LW 2RW, or the movable contact 2W is connected to either of the fixed contact 2LW and 2RW. On the other hand, a low-beam lamp 2' is lit in three cases when the movable contacts 2B is connected to the fixed contact 2LB and the movable contact 2W is in a neutral position or connected to either one of the fixed contacts 2LW and 2RW.

A left turn signal lamp 3 is turned on in two cases when the movable contact 2W is connected to the fixed contact 2LW and the movable contact 2B is connected either of the fixed contacts 2HB and 2LB. A right turn signal lamp 3' is turned on in two cases when the movable contact 2W is connected to the fixed contact 2RW and the movable contact 2B is connected to either one of the fixed contacts 2HB and 2LB. In this connection, it is to be noted that between head lamps 2 and 2' and the detecting circuit 27 is connected a conventional light switch (not shown) to keep said head lamps 2 and 2' to be turned off so long as said switch has not been closed.

The resistance value between the signal line 30 and the grounding line varies depending upon an operative position of the lever, etc. when only the dimmer switch 25b is operated or when both the dimmer switch 25b and the turn signal switch 25a are operated. Therefore, the detecting circuit 27 includes discriminating circuits (as in FIG. 5) so as to produce an output required for driving a specified lamp only when a specified voltage is applied to said detecting circuit 27. Thus, various kinds of indications can be effected by operating the winker-dimmer switch 25. Though the foregoing explanation are given only for a winker-dimmer switch, the present circuit may of course be employed for another combination of switches.

According to the present circuit of the invention, switches having two kinds of function are connected with one signal line through which two kinds of loads are controlled thereby to eliminate a bulky bundle of the signal lines. In the present circuit, a signal is transmitted in the form of voltage so that a signal detecting circuit can be simplified.

In FIG. 6, there is illustrated another circuit according to the system of the present invention which can set a signal voltage at a desired value. A turn signal switch 35a and a dimmer switch 35b respectively have auxiliary switches 35c and 35d which are associated respectively with said turn signal switch 35a and said dimmer switch 35b. For the dimmer switches 35b and 35d are used three-point switches. A movable contact 3W of the turn signal switch 35a and a movable contact 3W' of the auxiliary switch 35c are connected with each other. Between fixed contacts 3LW and 3RW and a grounding line are connected resistors $3R_1$ to $3R_2$. Between fixed contacts 3LW' and 3RW' of the auxiliary turn signal switch 35c and a movable contact 3B' of the auxiliary dimmer switch 35d are connected resistors $3R_5$ and $3R_6$. As mentioned above, the dimmer switches 35b and 35d are of three-point type. Stated illustratively, fixed contacts 3HB and 3HB' are for a high-beam lamp, 3LB and 3LB' for a low-beam lamp, and 3PB and 3PB' for a passing indication. The fixed contacts 3PB and 3PB' for a passing indication are adapted to be closed so long as a lever of a lever switch has been operated for the purpose. Between the fixed contacts 3HB, 3LB, 3HB', 3PB and 3PB' are respectively connected resistors $3R_3$, $3R_4$, $3R_7$, $3R_8$ and $3R_9$. A connecting point of the movable contacts 3W and 3W' of the turn signal switch is connected to the movable contact 3B of the dimmer switch 35b and further to a signal line 40.

Thus, in case only the turn signal switch 35a or only the dimmer switch 35b is operated, a signal voltage is determined by a resistance division of a resistor $3R_0$ with the resistors $3R_1$ to $3R_4$. In case both the turn signal switch 35a and the dimmer switch 35b are operated, in cooperation with the auxiliary switches 35c and 35d, a resistance value between the signal line 40 and the grounding line is determined according to a combination of the resistors $3R_1$ to $3R_9$, and a signal voltage is determined by a resistance division with the resistor $3R_0$. Accordingly, a desired signal voltage may be obtained by varying the resistance value of resistors $3R_5$ to $3R_9$. Whereas, in case the turn signal switch 35a and a dimmer switch 35b are operated at the same time, the resistance value between the grounding line and the signal line 40 is desirably determined to obtain a desired signal voltage.

Thus, it will be seen that when a lever of the winker-dimmer switch 35 is operated to switch the movable contact 3W of the turn signal switch 35a to either of the fixed contacts 3LW and 3RW, a turn signal lamp 3 or 3' corresponding to the fixed contact 3LW or 3RW to which the movable contact 3W is switched is lit. When the movable contact 3B of the dimmer switch 35b is connected to either of the fixed contacts 3HB and 3LB, a head lamp 2 or 2' corresponding to the connected contact is turned on, and when the movable contact 3B is connected alternatingly to the fixed contacts 3PB and 3LB, the head lamps 2 and 2' are lit alternatingly.

In case the movable contact 3B of the dimmer switch 35b is connected to one of the fixed contacts 3HB, 3LB and 3PB, if the turn signal switch 35a is operated, the head lamp 2 or 2' connected and the turn signal lamp 3 or 3' connected are lit.

In the foregoing, the present circuit is explained referring to a winker-dimmer switch, but of course the circuit may be applied to another combination of switches.

As mentioned above, according to the present circuit, is effectively eliminated a possible misdetection in a detecting circuit or a resultant failure in a lamp switching operation which may be caused due to the fact that there is a limitation for the values of the resistors employed in an automobile and that there are slight differences between the resistance value of the respective resistors and between a parallel resistance value obtained by a combination of the resistors and other combination of the resistors so that only little difference exists between signal voltages obtained by a resistance division.

Referring to FIGS. 7 to 9, there is illustrated another system of the present invention. As shown in FIG. 7, in a lever-switch body 44 are incorporated a turn signal switch 44', a dimmer switch 44'' and another switch 44'''. Numeral 47 designates a detecting circuit connected to the switches 44', 44'' and 44''' of the lever-switch 44 through respective signal lines 51', 51'' and 51'''. Numerals 2, 2', 3 and 3' represent loads such as turn signal lamps, high-and low-beam lamps, etc. Thus, depending upon an operative position of said lever-switch 44 a signal is transmitted from the switch 44', 44'' or 44''' and, then, detected in the detecting circuit 47 to turn on the load corresponding to the operative position of the lever of the lever-switch 44.

FIG. 8 shows a circuit according to the present system of the invention. In a lever switch 44 are incorporated a turn signal switch 44' and a dimmer and passing switch 44''. A detecting circuit 47 includes a driving circuit (relay) for loads 2, 2', 3 and 3' and is connected to the switches 44' and 44'' through signal lines 51' and 51''. The loads 2, 2', 3 and 3' are turn signal lamps and high- and low-beam lamps. The turn signal switch 44' is a two-way switch having a neutral position. A fixed contact 44'a is a contact for a left turn signal lamp and another fixed contact 44'b is a contact for a right turn signal lamp. Said fixed contact 44'a is connected directly to a grounding line and said fixed contact 44'b is connected to the grounding line through a resistor $4R_1$. Similarly, the dimmer and passing switch 44'' is a two-way switch having a neutral position. A fixed contact 44'' a is a contact for a high-beam head lamp and another fixed contact 44''b is a contact for a passing indication by a high-beam lamp. Said fixed contact 44''a is connected to the grounding line through a resistor $4R_2$ and said fixed contact 44''b is connected directly to the grounding line.

A movable contact 44'c of the turn signal switch 44' is connected to resistors $4R_3$ and $4R_4$ through a signal line 51'. Whereas, a movable contact 44''c of the dimmer and passing switch 44'' is connected to a resistor $4R_5$, a base of a transistor $Tr_5$ and a resistor $4R_{12}$. The resistors $4R_3$ and $4R_5$ are further connected to an emitter of a transistor $Tr_1$. A collector of said transistor is connected to a positive electrode of a power source E such as a battery mounted on an automobile and a base thereof is connected also to the positive electrode of the power source E through a resistor $4R_6$ and further connected to the grounding through a Zener diode ZD. The resistor $4R_4$ is further connected to a base of a transistor $Tr_2$ and to the grounding line through a resistor $4R_7$. A collector of said transistor $Tr_2$ is connected to the positive electrode of the power source E through a resistor $4R_8$ and to resistors $4R_9$ and $4R_{10}$. An emitter of said transistor $Tr_2$ is connected directly to the grounding line. The resistor $4R_9$ is further connected to anodes of diodes $D_1$ and $D_2$. The resistor $4R_{10}$ is further connected to anodes of diodes $D_3$ and $D_4$. A cathode of the diode $D_1$ is connected to a base of a transistor $Tr_3$, a cathode of the diode $D_2$ to a collector of the transistor $Tr_4$, a cathode of the diode $D_3$ to a base of the transistor $Tr_4$ and a cathode of the diode $D_4$ to the signal line $51'$. Between a collector of a transistor $Tr_3$ and the positive electrode of the power source E is connected a coil $L_1$ of a left turn signal relay $RL_1$. Between a collector of the transistor $Tr_4$ and the positive electrode of the power source E is connected a relay $L_2$ of a right turn signal relay. Emitters of transistors $Tr_3$ and $Tr_4$ are connected to the grounding line. Diodes $D_5$ and $D_6$ connected in parallel with the relay coils $L_1$ and $L_2$ are diodes for cancelling a back electromotive force. A collector of the transistor $Tr_5$ is connected to a base of a transistor $Tr_6$ and to the positive electrode of the power source E through a resistor $4R_{11}$. Between a collector of the transistor $Tr_6$ and the power source E is connected a coil $L_3$ of a beam-dimmer switching relay $RL_3$. A diode $D_7$ connected in parallel with said coil $L_3$ is a diode for cancelling a back electromotive force. The resistor $4R_{12}$ is further connected to a collector of a transistor $Tr_7$ and to the positive electrode of the power source E through the resistor $4R_{13}$. An emitter of the transistor $Tr_7$ is connected directly to the grounding line and a base thereof is connected to a lighting switch SW and a movable contact $S_{1a}$ of a first switch $S_1$ of the beam-dimmer switching relay $RL_3$ through a resistor $4R_{14}$. Said lighting switch SW is further connected to the positive electrode of the power source E. A terminal of low-beam lamp $3'$ is connected to the grounding line and another terminal thereof is connected to a normally closed fixed contact $S_{1b}$ of the first switch $S_1$. A terminal of a high-beam lamp 3 is connected to the grounding line and another terminal thereof is connected to a normally opened fixed contact $S_{2c}$ of a second switch $S_2$. A movable contact $S_{2a}$ of said second switch $S_2$ is connected to the positive electrode of the power source E. A normally opened fixed contact $S_{1c}$ of the first switch $S_1$ and a normally closed fixed contact $S_{2b}$ of the second switch $S_2$ are dummy contacts. A terminal of a left turn signal lamp $2'$ is connected to the grounding line and another terminal thereof is connected to a normally opened fixed contact $S_{3c}$ of a switch $S_3$ of the left turn signal relay $RL_1$. A terminal of a right turn signal lamp is connected to the grounding line and another terminal thereof is connected to a normally opened fixed contact $S_{4c}$ of a switch $S_4$ of the right turn signal relay $RL_2$. Movable contacts of the switches $S_3$ and $S_4$ are connected to a flasher unit F which is connected to the positive electrode of the power source E. Normally closed fixed contacts $S_{3b}$ and $S_{4b}$ are dummy contacts.

In operation:

The Zener diode ZD, the transistor $Tr_1$ and the resistor $4R_6$ form a constant voltage circuit. An emitter voltage of said transistor $Tr_1$ is kept at a voltage determined by the Zener diode ZD. In a state as shown in FIG. 8 where the movable contact $44'c$ of the turn signal switch $44'$ is in a neutral position, a current supplied through the resistor $4R_3$ flows through the resistor $4R_4$ to apply a base current for the transistor $Tr_2$ enough to be turned on. Accordingly, the transistors $Tr_3$ and $Tr_4$ are turned off so that no current flows through the coils $L_1$ and $L_2$ of the turn signal relays $RL_1$ and $RL_2$ and the left and right turn signal lamps 2 and $2'$ are not lit.

In order to light the left turn signal lamp 2, the movable contact $44'c$ of the turn signal switch $44'$ is connected to the fixed contact $44'a$. Then, a current supplied through the resistor $4R_3$ flows to said fixed contact $44'a$ through the signal line $51'$ to turn off the transistor $Tr_2$ and turn on the transistor $Tr_3$. In this connection, since a current passing through the resistor $4R_{10}$ flows to the grounding line through the diode $D_4$, the signal line $51'$ and the fixed contact $44'a$, the transistor $Tr_4$ is kept to be turned off. Therefore, a current flows only through the coil $L_1$ of the left turn signal relay $RL_1$ and the switch $S_3$ is operated to light the left turn signal lamp 2 through the flasher unit F.

For lighting the right turn signal lamp $2'$, the movable contact $44'c$ of the turn signal switch $44'$ connected to the fixed contact $44'b$. A current supplied through the resistor $4R_3$ flows mostly to the grounding line through the signal line $51'$ and the resistor $4R_1$ and a current flowing through the resistor $4R_4$ is not sufficient to turn on said transistor $Tr_2$. Accordingly, said transistor $Tr_2$ is turned off. In this connection, if the value of the resistors $4R_3$ and $4R_1$ are selected so that the voltage of the signal line $51'$ may be above a threshold voltage of a diode, by a voltage drop through the resistor $4R_1$, a current flowing through the resistor $4R_{10}$ is all used as a base current of the transistor $Tr_4$ through the diode $D_3$ to turn on said transistor $Tr_4$. At this time, a voltage at the anode side of the diode $D_3$ is about 1.2V so that a current does not flow through the diode $D_4$. When the transistor $Tr_4$ is turned on, a current supplied through the resistor $4R_9$ all flows to the grounding line through the diode $D_2$ and the transistor $Tr_4$ and no current flows through the transistor $Tr_3$ so that said transistor $Tr_3$ is turned off. Accordingly, a current flows only through the coil $L_2$ of the right turn signal relay $RL_2$ and the switch $S_4$ is operated to flash the right turn signal lamp $2'$ through the flasher unit F.

A dimmer operation is effected as follows. When the movable contact $44''c$ of the dimmer and passing switch $44''$ is in a neutral position as shown in FIG. 8, if the resistance value of the resistor $4R_{12}$ is sufficiently large, a current supplied through the resistor $4R_5$ is sufficient for the transistor $Tr_5$ to be turned on, whether the transistor $Tr_7$ is turned on or off. Then, the transistor $Tr_6$ is turned off and no current flows through the coil $L_3$ of the beam-dimmer switching relay $RL_3$ to keep the movable contacts $S_{1a}$ and $S_{2a}$ of the switches $S_1$ and $S_2$ in the positions as shown in FIG. 8. In this connection, if the lighting switch SW is closed, only the low-beam lamp $3'$ is lit and if the lighting switch SW is kept opened, neither of the high-beam lamp 3 and the low-beam lamp $3'$ is lit.

The lighting operation of the high-beam lamp 3 is now explained. When the movable contact $44''c$ of the dimmer and passing switch $44''$ is connected to the fixed contact $44''a$, if the lighting switch SW is opened, the transistor $Tr_7$ is turned off and a current supplied through the resistors $4R_{12}$, $4R_{13}$ and $4R_5$ is sufficient for the transistor $Tr_5$ to be turned on even though said current partially flows to the grounding line through the resistor $4R_2$. Therefore, the transistor $Tr_6$ is turned off and no current flows through the coil $L_3$ of the beam-dimmer switching relay $RL_3$ to keep the contact in the position as shown in FIG. 8.

In this state, neither of the low-beam lamp $3'$ and the high-beam lamp 3 is lit. If the lighting switch SW is then closed, the transistor $Tr_7$ is turned on. Then, a current from the resistors $4R_{12}$ and $4R_{13}$ to the base of the transistor $Tr_5$ is broken and a current supplied through the resistor $4R_5$ flows to the grounding line through the resistor $4R_2$ so that the transistor $Tr_5$ is turned off and the transistor $Tr_6$ is turned on. Resultantly, the coil $L_3$ of the beam-dimmer switching relay $RL_3$ is energized and the first and the second switches $S_1$ and $S_2$ are simultaneously operated, namely, the movable contact $S_{2a}$ of the second switch $S_2$ is connected to the normally opened fixed contact $S_{2c}$, thereby to light only the high-beam lamp 3.

A passing indication operation is described hereunder. When the movable contact $44''c$ of the dimmer and passing switch $44''$ is connected to the fixed contact $44''b$, the base of the transistor $Tr_5$ is connected to the grounding line through the signal line $51''$ whether the lighting switch SW is closed or opened, so that the transistor $Tr_5$ is turned off and the transistor $Tr_6$ is turned on. Resultantly, the beam-dimmer switching relay $RL_3$ is energized to operate the switches $S_1$ and $S_2$, namely, the movable contacts $S_{1a}$ and $S_{2a}$ are respectively connected to the normally opened fixed contacts $S_{1c}$ and $S_{2c}$, to light the high-beam lamp 3. Accordingly, when the lighting switch SW is closed and the movable contact $44''c$ of the dimmer and passing switch $44''$ is intermittently connected to the fixed contact $44''b$, the low-beam lamp $3'$ and the high-beam lamp 3 are alternatingly energized. When the same operation is performed with the lighting switch SW opened, only the high-beam lamp 3 is flashed. Thus, the passing indication at night or in the day time is effected.

FIG. 9 shows another circuit according to the present system of the invention. In the present circuit, diodes $D_8$ and $D_9$ are employed in place respectively of the resistor $4R_1$ connected to the turn signal switch $44'$ and the resistor $4R_2$ connected to the dimmer and passing switch $44''$ as shown in FIG. 8. A movable contact $44'c$ of a turn signal switch $44'$ is connected to emitters of a transistors $Tr_8$ and $Tr_9$ through a signal line $51'$. A movable contact $44''c$ of a dimmer and passing switch $44''$ is connected to an emitter of a transistor $Tr_{10}$ through a signal line $51''$. Between a collector of said transistor $Tr_8$ and a positive electrode of a power source E is connected a coil $L_1$ of a left turn signal relay $RL_1$ and between a collector of the transistor $Tr_9$ and the positive electrode of the power source E is connected a coil $L_2$ of a right turn signal relay $RL_2$. Diodes $D_5$ and $D_6$ are diodes for cancelling a back electromotive force. A base of the transistor $Tr_8$ is connected to a junction of a resistor $4R_{17}$ and a cathode of a Zener diode $ZD_1$ through a resistor $4R_{14}$. Said base of the transistor $Tr_8$ is connected further to a grounding line through the resistor $4R_{15}$ and a diode $D_{10}$. A base of the transistor $Tr_9$ is connected to a collector of the transistor $Tr_8$ through a resistor $4R_{16}$ and to the grounding line through a resistor $4R_{21}$. The resistor $4R_{17}$ is further connected to the positive electrode of the power source E and an anode of the Zener diode $ZD_1$ is connected to the grounding line. Between a collector of a transistor $Tr_{10}$ and the positive electrode of the power source E is connected a coil $L_3$ of a beam-dimmer switching relay $RL_3$. A diode $D_7$ is a diode for cancelling a back electromotive force. A base of the transistor $Tr_{10}$ is connected to resistors $4R_{18}$, $4R_{19}$ and $4R_{20}$. The resistor $4R_{19}$ is further connected to a lighting switch SW and the resistance $4R_{20}$ is further connected to the grounding line through the diode $D_{10}$. A driving circuit as shown in FIG. 8 is employed in the present circuit.

In operation:

The Zener diode $ZD_1$ and the resistor $4R_{17}$ form a constant voltage circuit. As bases of the transistors $Tr_8$ and $Tr_{10}$ are kept at a reference voltage by the resistors $4R_{14}$, $4R_{15}$, the diode $D_{10}$ and the resistors $4R_{18}$ and $4R_{19}$, the transistors $Tr_8$ and $Tr_{10}$ are turned on or off depending upon their emitter voltages.

When the movable contact $44'c$ of the turn signal switch $44'$ is at the neutral position, both emitters of the transistors $Tr_8$ and $Tr_9$ are left open so that no current flows through the coils $L_1$ and $L_2$ of the turn signal relays $RL_1$ and $RL_2$ and the left and right turn signal lamps 2 and $2'$ are not lit. At this instance, electrical potential at the base of the transistor $Tr_9$, accordingly potential at the emitter of the transistor $Tr_8$ becomes lowerly resistance divided between the resistors $4R_{16}$ and $4R_{21}$ which can prevent an intense backward bias voltage from being applied between the emitter and base of the transistor $Tr_8$.

In order to light the left turn signal lamp 2, the movable contact $44'c$ of the turn signal switch $44'$ is connected to the fixed contact $44'a$. Then the emitter of the transistor $Tr_8$ is connected to the ground through the signal line $51'$ to turn on the transistor $Tr_8$. The transistor $Tr_9$ is kept to be turned off since no current is supplied to the base thereof when the transistor $Tr_8$ is turned on. Therefore, a current flows only through the coil $L_1$ of the left turn signal relay $RL_1$ and the switch $S_3$ is operated to light the left turn signal lamp 2 through the flasher unit F.

For lighting the right turn signal lamp $2'$, the movable contact $44'c$ of the turn signal switch $44'$ is connected to the fixed contact $44'b$. The voltage at the emitter of the transistor $Tr_8$ rises by a threshold voltage value of the diode $D_8$ so that no current is supplied to the base of the transistor $Tr_8$ and accordingly, said transistor $Tr_8$ is turned off. To the transistor $Tr_9$ at the base thereof, a current is supplied through the coil $L_1$ of the left turn signal relay $RL_1$ and the resistor $4R_{16}$. Then, a current flows through the coil $L_2$ of the right turn signal relay $RL_2$ and the switch $S_4$ is operated to light the right turn signal lamp $2'$ through the flasher unit F. The base current flowing through the coil $L_1$ of the left turn signal relay $RL_1$ is restricted by the resistor $4R_{16}$ to keep the switch $S_3$ inoperative.

A dimmer operation is effected as follows. When the movable contact $44''c$ of the dimmer and passing switch $44''$ is in a neutral position as shown in FIG. 9, the transistor $Tr_{10}$ is kept off since the emitter thereof is left open, and the beam-dimmer switching relay $RL_3$ is inoperative. Therefore, the low-beam lamp $3'$ is energized only when the lighting switch SW is closed.

The lighting operation of the high-beam lamp 3 is now explained. When the movable contact $44''c$ of the dimmer and passing switch $44''$ is connected to the fixed contact $44''a$, if the lighting switch SW is opened, the transistor $Tr_{10}$ is kept off by the threshold voltage of the diode $D_9$. Therefore, the beam-dimmer switching relay $RL_3$ is inoperative and neither the low-beam lamp $3'$ nor the high-beam lamp 3 is energized. If the lighting switch SW is then closed, the transistor $TR_{10}$ is turned on with sufficient base current supplied through the resistor $4R_{19}$. Resultantly, a current flows through the coil $L_3$ of the beam-dimmer switching relay $RL_3$ and the switches $S_1$ and $S_2$ are simultaneously operated to light only the high-beam lamp 3.

A passing indication operation is described hereunder. When the movable contact $44''c$ of the dimmer and passing switch $44''$ is connected to the fixed contact $44''b$, the transistor $Tr_{10}$ is turned on irrespective of close or open operation of the lighting switch SW, since the emitter of said transistor $Tr_{10}$ is connected to the ground through the signal line $51''$. Resultantly, the coil $L_3$ of the beam-dimmer switching relay $RL_3$ is energized and the switches $S_1$ and $S_2$ are operated to light the high-beam lamp 3. Accordingly, when the lighting switch SW is closed and the movable contact $44''c$ of the dimmer and passing switch $44''$ is intermittently connected to the fixed contact $44''b$, the low-beam lamp $3'$ and the high-beam lamp 3 are alternatingly energized. When the same operation is performed with the lighting switch SW opened, only the high-beam lamp 3 is flashed.

In the above embodiments, description was made only on the left and right turn signals, switching of the high-and low-beams and a passing indication. However, it is obvious that the present system can be applied to hazard warning operation, wiper operating mechanism etc.

What is claimed is:

1. A circuit system for controlling energization of loads by actuation of switches in an automotive vehicle, comprising in combination:
   a switching section provided adjacent to the vehicle driver's position and including switch means having a plurality of fixed contacts and a movable contact engageable therewith, said switching section further including passive elements having different values, said passive elements being connected between said fixed contacts and ground;
   a detecting circuit provided adjacent to the loads and apart from said switching section, said detecting circuit including control signal generating circuit means connected to said movable contact of said switching section through a single signal line for generating a load controlling signal according to the position of said movable contact in cooperation with said passive elements of said switching section, said detecting circuit further including discriminating circuit means for discriminating the operative position of said switch means of the switching section by a further signal from said control signal generating circuit means and drive circuit means operable upon receiving a still further signal from said discriminating circuit means for driving the one of said loads corresponding to the operative position of said switch means of the switching section.

2. A circuit system as claimed in claim 1, wherein said switch means comprises first and second switches each having a movable contact and a plurality of fixed contacts, said passive elements being connected between corresponding ones of said fixed contacts of said first and second switches and ground.

3. A circuit system as claimed in claim 2, wherein said passive elements are resistors of different values, said switching section including a resistance dividing resistor for applying current through said first and second switches and said first mentioned resistors.

4. A circuit system as claimed in claim 7, in which said discriminating circuit means includes a plurality of OR gates, each having an output for actuating a respective one of said loads and inputs each corresponding to selection of a corresponding fixed contact of said switching section alone or in combination with selection of other fixed contacts of said switching section associated with others of said loads.

5. A circuit system as claimed in claim 2, in which said control signal generating circuit means comprises a unijunction transistor having a control electrode, said movable contacts of said first and second switches being connected together through said single line to said control electrode, said passive elements comprising capacitors, said first and second switches being associated with different groups of loads on said vehicle, the capacitors associated with each of said switches being associated with different loads of the corresponding group, said capacitors being of different values for each load causing, when connected through a corresponding movable contact, said unijunction to produce a pulse train of repetition rate associated with the corresponding load.

6. A circuit system as claimed in claim 2, in which said control signal generating circuit means includes a transistor oscillator, the movable contacts of said first and second switches being connected by a common single line to electrodes of said transistor oscillator, said passive elements being capacitors connectible by the corresponding movable contact of the corresponding switch to said transistor oscillator for determining an output frequency thereof corresponding to the one of said loads associated with the one of said capacitors selected by said corresponding movable contact.

7. A circuit system as claimed in claim 1, wherein said switch means comprises a first and a second switch and first and second auxiliary switches respectively associated with said first and second switches, said passive elements being resistors of different values, said first switch and said first auxiliary switch having movable contacts connected with each other, said first auxiliary switch being connected to a movable contact of said second auxiliary switch and said movable contacts of said first switch and first auxiliary switch being further connected to a movable contact of the second switch, said switching section including a resistance dividing resistor.

8. A circuit system as claimed in claim 1, in which said switching section includes first and second switches each having a movable contact and fixed contacts and including a constant voltage supply circuit and further passive elements driven thereby and connected to corresponding ones of said movable elements, said control signal generating circuit means including a portion connected to the movable contact of at least one of said first and second switches and having a transistor changeable in state upon selection of one of said fixed contacts of said one switch by said movable contact thereof, said discriminating circuit means including second and third transistors and diode logic means interconnecting same with said first transistor for alternatively causing change in state of said second and third transistors dependent upon the fixed contact of said one switch selected by said movable contact thereof, said drive circuit means including relays driven by said second and third transistors for actuating loads associated respectively with the several fixed contacts of said one switch.

9. A circuit system as claimed in claim 8, wherein said control signal generating means and discriminating circuit means further include additional transistors and means connecting same to the movable contact of the other of said first and second switches and said drive circuit means includes a further relay driven by said additional transistors and connected to further ones of said loads associated with said other switch.

10. A circuit system as claimed in claim 1, wherein said passive elements are diodes.

11. A circuit system as claimed in claim 10, wherein said control signal generating circuit means includes a constant voltage supply and means including a control electrode and a main current carrying electrode of a semiconductor device connecting same to said movable contact of said switching section so that the voltage level of said main current carrying electrode is a function of the one of said fixed contacts to which said movable contact is connected, said discriminating means including circuitry governing conduction or nonconduction of said semiconductor device in response to said voltage on said main current carrying electrode and said drive circuit means including at least one relay in series with another main current carrying electrode of said semiconductor device and having contact means for energizing the one of said loads associated with the fixed contact with which said movable contact is connected.

12. A circuit system as claimed in claim 2, in which first and second switches are a turn signal switch and a headlamp dimmer switch, respectively, and the loads associated therewith are turn signal lamps and headlamps, respectively.

\* \* \* \* \*

UNITED STATES PATENT OFFICE
CERTIFICATE OF CORRECTION

Patent No. 3,739,185     Dated June 12, 1973

Inventor(s) Tetsuji Shimizu, Yoichi Hotta & Takaomi Yoshida

It is certified that error appears in the above-identified patent and that said Letters Patent are hereby corrected as shown below:

Title Page, Column 1, line 8; in the name of the Assignee, "Seisakusha" should read ---Seisakusho---.

Column 11, line 67; "claim 7" should read ---claim 3---.

Column 12, lines 53 and 54; "elements" should read ---contacts---.

Column 12, line 61; "causing change" should read ---causing a change---.

Signed and sealed this 23rd day of April 1974.

(SEAL)
Attest:

EDWARD M. FLETCHER, JR.
Attesting Officer

C. MARSHALL DANN
Commissioner of Patents